(12) United States Patent
Gordon

(10) Patent No.: US 7,228,102 B2
(45) Date of Patent: Jun. 5, 2007

(54) RESONANT FREQUENCY USER PROXIMITY DETECTION

(75) Inventor: Gary B. Gordon, Saratoga, CA (US)

(73) Assignee: Avago Technologie ECBU IP (Singapore) Pte. Ltd., Singapore (SG)

( * ) Notice: Subject to any disclaimer, the term of this patent is extended or adjusted under 35 U.S.C. 154(b) by 514 days.

(21) Appl. No.: 10/635,753

(22) Filed: Aug. 5, 2003

(65) Prior Publication Data
US 2005/0032474 A1  Feb. 10, 2005

(51) Int. Cl.
*H04B 7/14* (2006.01)
(52) U.S. Cl. .............................. 455/19; 455/82; 455/83; 345/163
(58) Field of Classification Search ................. 455/19, 455/63.4, 82, 83, 562.1, 107, 129; 345/163
See application file for complete search history.

(56) References Cited

U.S. PATENT DOCUMENTS 5,170,496 A * 12/1992 Viereck ...................... 455/121
2002/0126094 A1 * 9/2002 Junod et al. ................ 345/163

* cited by examiner

*Primary Examiner*—Matthew Anderson
*Assistant Examiner*—Sanh D Phu

(57) ABSTRACT

An electronic device able to detect a user in close proximity. The device may be a wireless data input device, for example, a radio frequency computer mouse. The device has power management features that do not require complex hardware or software to implement. For example, an antenna that is normally used for radio transmission is monitored. The power management features of the electronic device are able to detect a change in an operating characteristic of the antenna that is indicative of a user in close proximity thereto. For example, when the user touches a computer mouse, the resonant frequency of a circuit comprising the antenna changes due to capacitive loading of the antenna. The power management features cause the electronic device to be operated in a sleep mode or a radio transmission mode, depending on whether the user is detected.

14 Claims, 4 Drawing Sheets

RESONANT FREQUENCY USER PROXIMITY DETECTION

TECHNICAL FIELD

Embodiments in accordance with the invention relate to the field of detecting user proximity to an electronic device. Specifically, embodiments in accordance with the invention relate to an electronic device that senses a user in close proximity thereto by detecting a change in impedance in an antenna that is operated at or near a resonant frequency.

BACKGROUND ART

Many electronic devices benefit from being able to detect an object, such as a user, in close proximity to the electronic device. For example, the state in which an electronic device operates can be based, at least in part, on user proximity. In one approach, by detecting the absence of a user, the electronic device can operate in a power down mode. This is especially useful for battery operated devices.

Wireless communications devices are one example of an electronic device that can benefit from detecting the presence or absence of a user. Wireless communications devices have proliferated due to their convenience. However, power consumption is a major issue in such devices because many wireless communications devices are battery operated.

One conventional technique for saving power in a wireless communication device 105 is illustrated in FIG. 1. This conventional technique uses an oscillator 110 coupled to an antenna 115. When the user 120 comes into close proximity with the antenna 115 coupled to the oscillator 110, the capacitance of the oscillator antenna 115 is altered, which causes the frequency of the oscillator 110 to change. The detect/control circuit 140 detects the frequency change and increases the power to the transceiver 130. Thus, the change in oscillator frequency indicates that a user 120 is in close proximity to the oscillator antenna 115. However, this conventional technique requires the oscillator antenna 115 be physically separate from the antenna 125 of the radio transceiver 130. Electronic devices, such as wireless mice, have limited space for antennas. Thus, the two separate antennas must compete for space. Having competing antennas in a limited space has the potential to degrade performance of the radio transceiver. Moreover, the oscillator, its antenna, and associated circuitry add to the complexity and expense of the electronic device.

Conventional wireless communication devices consume more power than is desirable. Devices to limit power consumption are available, but they suffer from additional problems. Conventional power management circuitry is often complex and expensive. Moreover, the circuitry of conventional power management devices sometimes interferes with the normal operation of the device in which the power management circuitry resides.

SUMMARY OF THE INVENTION

Embodiments in accordance with the invention pertain to an electronic device able to detect a user in close proximity thereto. The electronic device may be a wireless data input device, for example, a radio frequency computer mouse. However, embodiments in accordance with the invention are applicable to other electronic devices. The electronic device has power management features that are easy to implement.

BRIEF DESCRIPTION OF THE DRAWINGS

The accompanying drawings, which are incorporated in and form a part of this specification, illustrate embodiments according to the invention and, together with the description, serve to explain the principles of embodiments in accordance with the invention.

DETAILED DESCRIPTION OF THE INVENTION

For example, an antenna that is normally used for radio transmission is monitored. The power management features of the electronic device are able to detect a change in an operating characteristic of the antenna that is indicative of a user in close proximity thereto. For example, when the user touches the computer mouse, the impedance of the antenna changes due to capacitive loading on the antenna from the user. The power management features cause the electronic device to be operated in a sleep mode or a radio transmission mode, depending on whether the user is detected.

The capacitive loading on the antenna from the user causes the resonant frequency of a circuit comprising the antenna to change. The device may be configured such that the antenna is operated at the resonant frequency of the circuit when the user is not in close proximity to the electronic device. When the user comes into close proximity to the antenna, the resonant frequency of the circuit is altered by capacitive loading on the antenna, such that the antenna no longer operates at resonance. When no longer at resonance, there will be a large drop in voltage at the antenna, which is easily measurable. The power management features detect a voltage change at the antenna that occurs due to the difference between operating at resonance or not operating at resonance. In response to the voltage change, the power management features increase the power at which the electronic device is operated. In another embodiment in accordance with the invention, the antenna may be operated at a frequency that is close to the resonant frequency when the user is not in close proximity, but is not the resonant frequency. When the user comes into close proximity to the antenna, the resonant frequency of the circuit is changed by the capacitive loading to the antenna, such that the antenna now operates at resonance. The power management features detect an increase in voltage associated with the antenna operating at resonance with the user in close proximity. In response to the voltage increase, the power management features increase the power at which the electronic device is operated.

Figure 1:
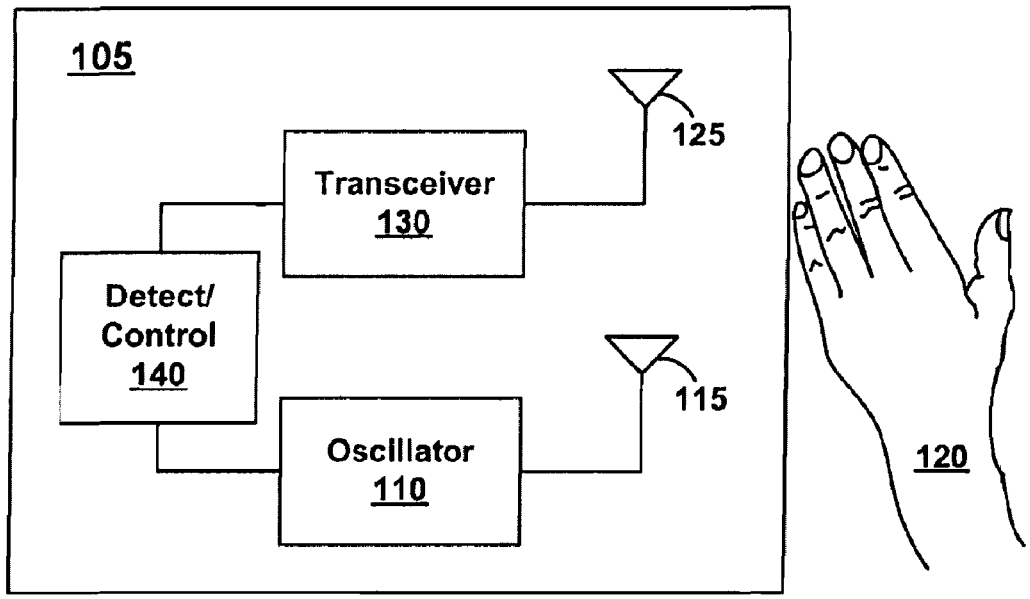
FIG. 1 is a diagram illustrating a conventional technique for detecting a user in close proximity to an electronic device.
Figure 2:
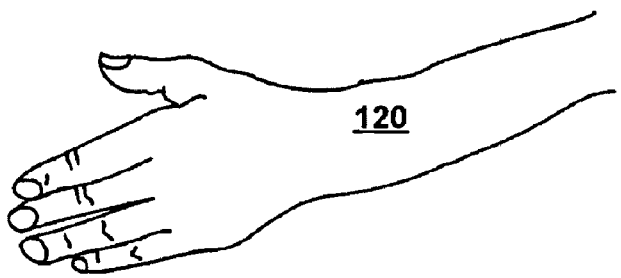
FIG. 2 is diagram illustrating a technique for detecting a user in close proximity to an electronic device according to embodiments in accordance with the invention.
Figure 2:
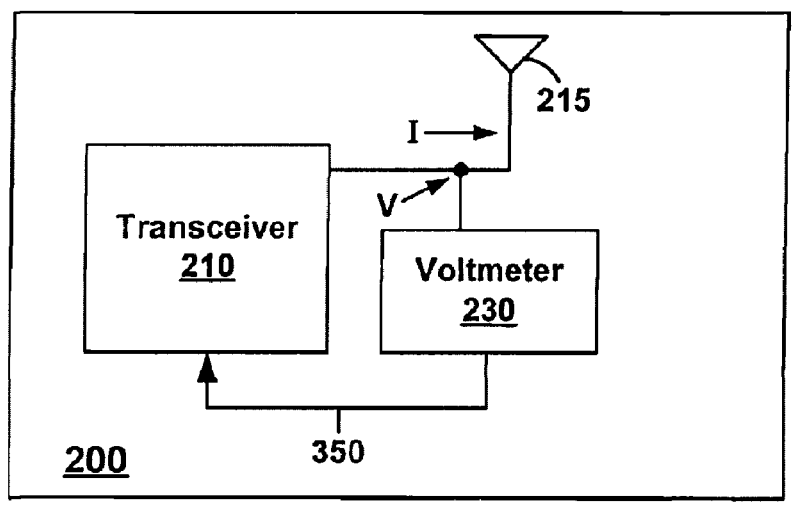

FIG. 2 is a block diagram illustrating detecting a user 120 in close proximity to an electronic device 200 having an antenna 215 operating at or near a resonant condition, according to embodiments of the invention. The electronic device 200 includes a radio transceiver 210 and an antenna 215 being stimulated by a current (I). The antenna 215 is operated at or near a resonant frequency. In contrast to conventional techniques, such as illustrated in FIG. 1, that require an antenna in addition to the transmission antenna to detect a user 120, embodiments in accordance with the invention use the device's existing RF antenna 215. Hence, embodiments in accordance with the invention do not require an additional antenna to detect a user 120 in close proximity to the electronic device 200. The antenna 215 and its transceiver 210 are used by the electronic device 200 during normal radio operation. Other components of the electronic device 200 are not shown so as to not obscure the diagram of FIG. 2. Moreover, embodiments in accordance with the invention do not require an additional oscillator or the like to detect user proximity, unlike the conventional technique illustrated in FIG. 1.

By operating the antenna at or near a resonant frequency, embodiments in accordance with the invention are able to detect very small changes in capacitive loading on the antenna and to provide a user detection signal in response thereto. As shown in FIG. 2, embodiments in accordance with the invention provide the user detection signal as an output on line 350. The user detection signal is used to control the power state in which the radio transceiver is operated. In so doing, embodiments in accordance with the invention allow the radio transceiver to be operated at a very low power when the device is not in use.

More specifically, when the user 120 comes into close proximity with the antenna 215, the impedance of the antenna 215 is affected, thus changing the resonant condition of a circuit comprising the antenna. Hence, the resonant frequency of the circuit comprising the antenna 215 changes. However, the frequency at which the antenna is operated remains the same. Therefore, the circuit comprising the antenna 215 moves either closer to or farther from a resonant condition. For example, the user 120 causes capacitive loading on the antenna 215, thus changing the resonant frequency of the circuit comprising the antenna 215. In one embodiment in accordance with the invention, the frequency at which the antenna 215 is operated matches the resonant frequency of the circuit comprising the antenna 215 without the user 120 in close proximity. Thus, the antenna is at resonance when the user is not in close proximity. The electronic device 200 operates in a low power operational mode at this time. In this embodiment in accordance with the invention, when the user 120 comes into close proximity to the antenna 215, the capacitive loading on the antenna 215 from the user 120 changes the resonant frequency of the circuit comprising the antenna 215. Thus, the antenna 215 is no longer at resonance. When the resonant frequency of circuit comprising the antenna 215 no longer matches the operating frequency of the antenna 215, a voltage (V) at the antenna 215 will drop sharply. Embodiments in accordance with the invention detect the drop in voltage (V) indicating that a user 120 is in close proximity to the antenna 215. The electronic device 200 is thus put into a high power operational mode.

Alternatively, in another embodiment in accordance with the invention, the frequency at which the antenna 215 is operated is close to but does not match the resonant frequency of the circuit comprising the antenna 215 without the user 120 in close proximity to the device 200. Thus, the antenna 215 is not at resonance when the user is not in close proximity. At this time, the electronic device 200 operates in a low power operational mode. In these embodiments in accordance with the invention, when the user 120 comes into close proximity to the antenna 215, the capacitive loading on the antenna 215 from the user 120 changes the resonant frequency of the circuit comprising the antenna 215 such that the resonant frequency of the circuit comprising the antenna 215 now matches the frequency at which the antenna 215 operates. Thus, the antenna 215 is at resonance when the user is in close proximity. With the antenna 215 now at resonance, a voltage (V) at the antenna 215 will increase sharply as compared to the voltage (V) when the user 120 is not in close proximity. Embodiments in accordance with the invention detect the increase in voltage (V) indicating that a user 120 is in close proximity to the antenna 215. The electronic device 200 is thus put into a high power operational mode.

Referring still to FIG. 2, the electronic device 200 is able to detect changes in impedance of the antenna 215 when a user 120 comes into close proximity to the antenna 215. As earlier discussed, the power management features detect a voltage change at the antenna 215 that occurs due to the difference between a circuit comprising the antenna 215 operating at resonance or not operating at resonance, due to a change in resonant condition that occurs from user proximity. A voltmeter 230 is used to measure voltage changes at the antenna 215, which indicate changes in impedance of the antenna 215. For example, in one embodiment in accordance with the invention, a current (I) of constant amplitude is fed into the antenna 215. Under such a condition, a change in voltage (V) indicates a change in impedance. Thus, user proximity is readily detectable in embodiments in accordance with the invention.

Figure 3:
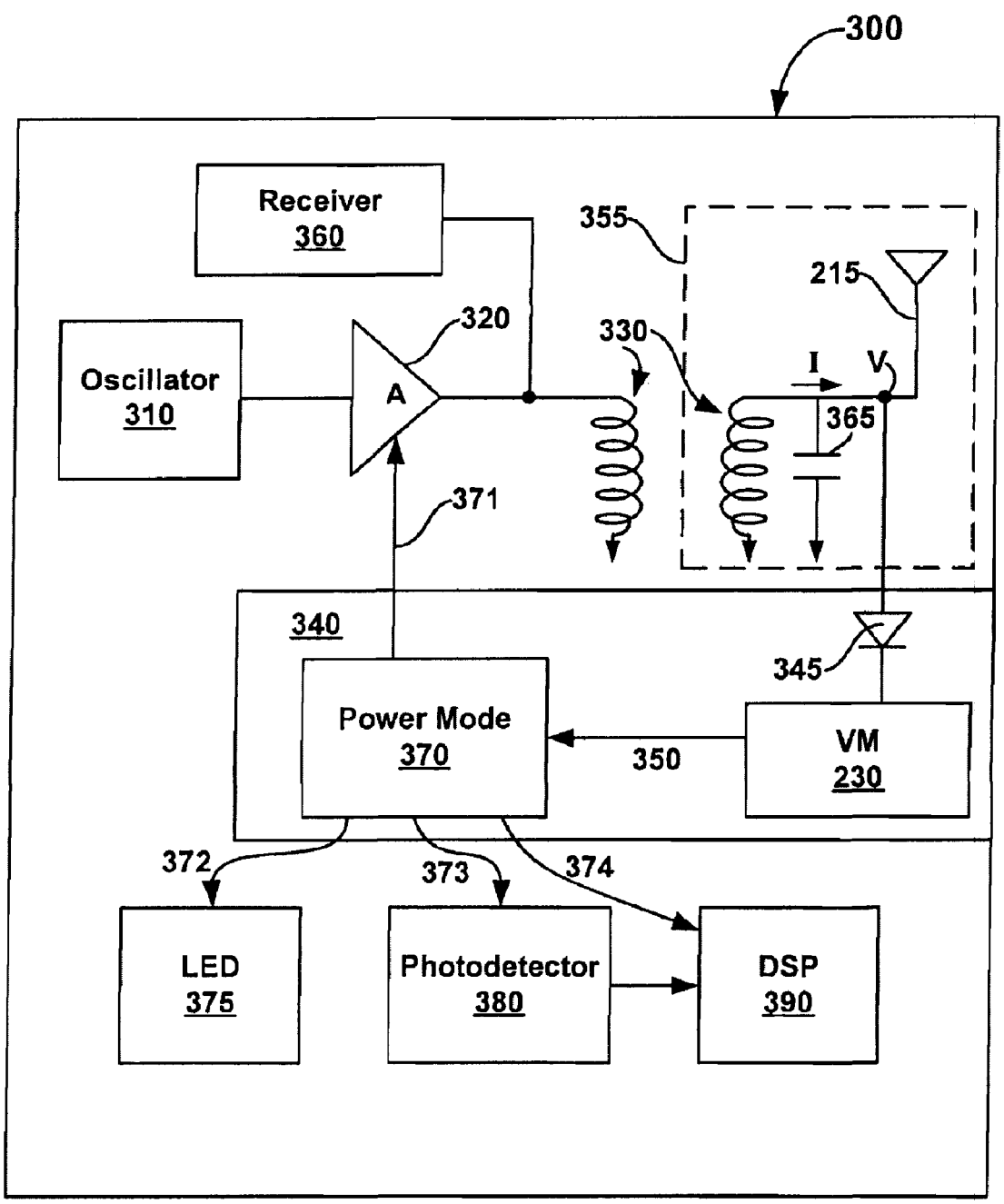
FIG. 3 is a diagram of a circuit able to detect a user in close proximity according to embodiments in accordance with the invention.

FIG. 3 illustrates an electronic device 300 having a circuit 340 for detecting a user 120 in close proximity to the electronic device 300, in accordance with an embodiment of the invention. Embodiments in accordance with the invention are compatible with existing wireless input devices, such as a computer mice, without a revamping of hardware design of the existing wireless input device. However, embodiments in accordance with the invention are applicable for devices other than optical computer mice devices and also devices other than computer mice.

Referring still to FIG. 3, the electronic device 300 has a small light-emitting diode (LED) 375. Light from the LED 375 reflects off almost any surface and back to a complimentary metal oxide semiconductor (CMOS) sensor 380. The CMOS sensor 380 sends image data to a digital signal processor (DSP) 390, which analyzes the image data to determine the cursor movement. The electronic device 300 transmits data to, for example, a host computer, which allows the host computer to display cursor location and movement. Power consumption is an even greater issue in an optical mouse than a conventional tracking ball mouse, because of power consumed by the LED 375, DSP 390, and photo-detector 380. Therefore, it is desirable to operate the LED 375, DSP 390, and photo-detector 380 in a power-saving mode at least a part of the time when the electronic device 300 is not in use. Moreover, the electronic device 300 has an amplifier 320 that is run in a power-saving mode at least a part of the time when the electronic device 300 is not in use.

Still referring to FIG. 3, the electronic device 300 comprises a crystal oscillator 310 with its output fed to an amplifier 320 that drives the antenna 215 via an inductive coupling mechanism 330. As previously discussed, the electronic device 300 is operated at an operating frequency that is either at or near the resonant frequency of a circuit comprising the antenna 215 without the user in close proximity, according to alternative embodiments of the invention. The operating frequency of the electronic device 300 does not change during operation. In FIG. 3, the circuit comprising the antenna 215 may comprise the antenna 215 and a portion of the inductive coupling mechanism 330 is series therewith and a capacitor 365. For purposes of explanation, this circuit with be referred to as the resonant circuit 355. In some embodiments, the antenna 215 is small compared to the wavelength at which the antenna 215 operates, such that the antenna 215 functions as a capacitor. The resonant condition for the resonant circuit 355 is given by Equation 1.

Equation 1:

$$f_r = \frac{1}{2\Pi\sqrt{LC}}$$

In Equation 1, $f_r$ is the resonant frequency, L is the inductance in series with the antenna 215, and C is the capacitance due to the antenna 215 and the capacitor 365. When the user comes into close proximity to the antenna 215, the capacitance of the antenna 215 is altered and thus, as Equation 1 indicates, the resonant frequency, $f_r$, of the resonant circuit 355 is altered. For example, an increase in the capacitance will cause a decrease in the resonant frequency, $f_r$. For purposes of explanation, the resonant frequency when the user is in close proximity will be referred to as the loaded resonant frequency, $f_{r\_loaded}$, and the resonant frequency when the user is not in close proximity will be referred to as the un-loaded resonant frequency, $f_{r\_loaded}$. Equations 2 and 3 provide the resonant frequencies for the un-loaded and loaded conditions, where $C_{un-loaded}$ is the capacitance of the antenna 215 and capacitor 365 of the resonant circuit 355 without the user, and $C_{loaded}$ is the capacitance of the antenna 215 and capacitor 365 of the resonant circuit 355 with the user in close proximity.

Equation 2:

$$f_{r\_un\text{-}loaded} = \frac{1}{2\Pi\sqrt{LC_{un\text{-}loaded}}}$$

Equation 3:

$$f_{r\_loaded} = \frac{1}{2\Pi\sqrt{LC_{loaded}}}$$

Figure 5:
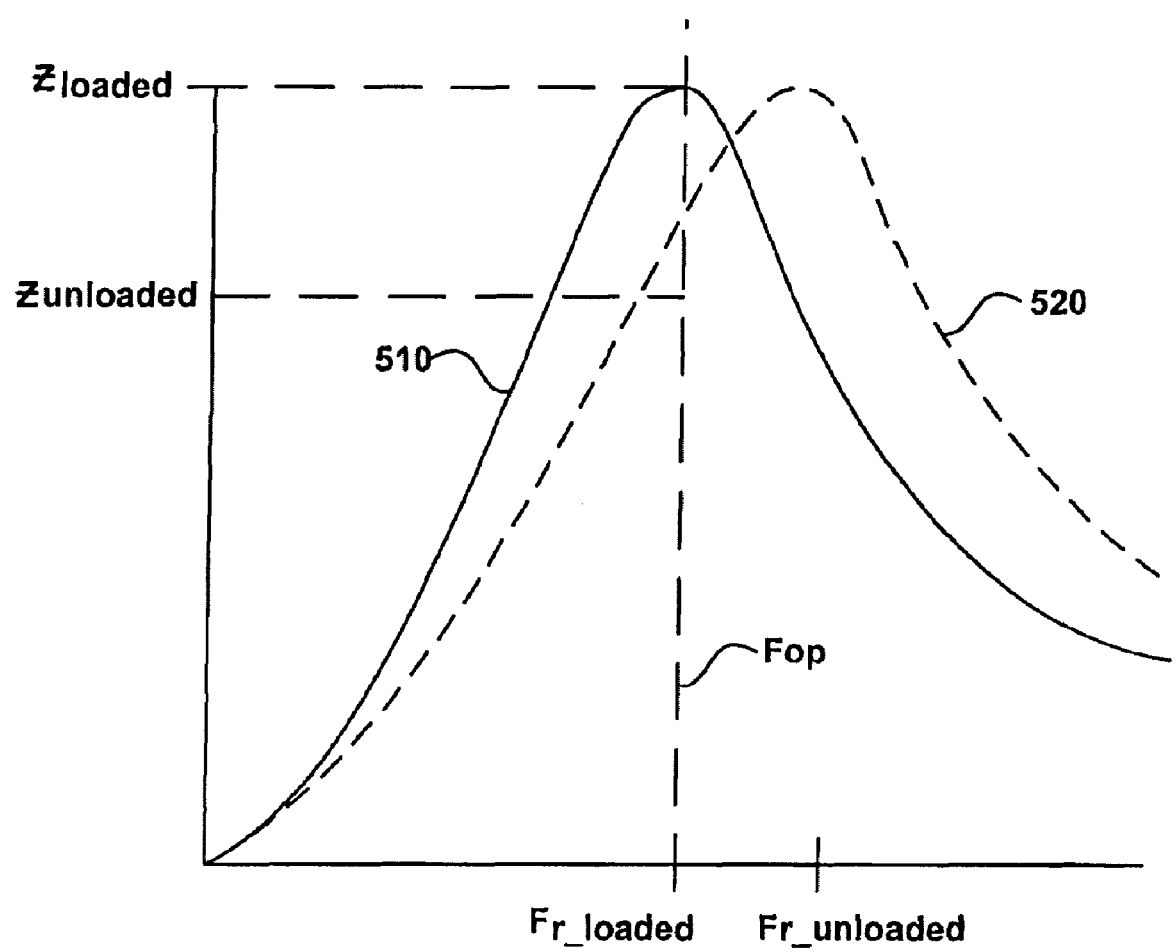
FIG. 5 is a graph showing impedance versus frequency curves of a resonant circuit of an electronic device according to an embodiment in accordance with the invention.

FIG. 5 illustrates a graph 500 of impedance versus frequency for the resonant circuit 355 in accordance with an embodiment of the invention. Curve 510 depicts the impedance of the resonant circuit 355 when the antenna 215 is loaded by a user in close proximity. Curve 510 has a peak in impedance at the loaded resonant frequency, $f_{r\_loaded}$. Curve 520 depicts the impedance of the resonant circuit 355 when the antenna 215 is not loaded by a user in close proximity. Curve 520 has a peak in impedance at the resonant frequency, $f_{r\_unloaded}$. Thus, the impedance of each curve 510, 520 peaks at its respective resonant frequency, but drops off sharply as the frequency moves away from the resonance frequency. Embodiments in accordance with the invention are able to detect the change in impedance in the resonant circuit 355 caused by the user being either in close proximity to the antenna 215 or not in close proximity.

In one embodiment in accordance with the invention, the operating frequency, $f_{op}$, of the antenna 215 matches the loaded resonant frequency, $f_{r\_loaded}$. This is depicted by the dashed line labeled $f_{op}$ in FIG. 5. The intersection of the curve 510 with the dashed line labeled $f_{op}$ defines the impedance of the resonant circuit 355 when the user is in close proximity to the antenna 215. This impedance is $Z_{loaded}$ on the impedance axis. Thus, the impedance of the resonant circuit 355 is high when the user is in close proximity. The intersection of the curve 520 with the dashed line labeled $f_{op}$ defines the impedance of the resonant circuit 355 when the user is not in close proximity to the antenna 215. This impedance is $Z_{unloaded}$ on the impedance axis. Thus, impedance of the resonant circuit 355 is low when the user is in not close proximity. Embodiments in accordance with the invention detect the change in impedance of the resonant circuit 355, which indicates whether the user is in close proximity to the antenna 215 or not.

Referring again to FIG. 3, the change in impedance is detected as a change in voltage (V) by the voltmeter 230 of the electronic device 300, in accordance with the invention. As previously discussed, in one embodiment in accordance with the invention, the antenna 215 is operated at the resonant frequency without the user in close proximity to the antenna 215. For example, the oscillator 310 provides a signal to drive the antenna 215 at the un-loaded resonant frequency, $f_{r\_un-loaded}$. In such an embodiment in accordance with the invention, the antenna 215 is at resonance when the user is not in close proximity. The power management circuit 340 detects the high voltage level and causes the electronic device 300 to be operated in a low power operational mode because the user is not in close proximity to the antenna 215. When the user comes into close proximity to the antenna 215, the capacitive loading to the antenna 215 causes the resonant frequency of the resonant circuit 355 to change to the loaded resonant frequency, $f_{r\_loaded}$. However, the antenna 215 continues to be driven at the un-loaded resonant frequency, $f_{r\_un-loaded}$. Thus, the resonant circuit 355 is no longer at a resonant condition. Therefore, there will be a voltage (V) drop at the antenna 215. The power management circuit 340 detects the low voltage level and causes the electronic device 300 to be operated in a high power operational mode because the user is in close proximity.

As also previously discussed, in another embodiment in accordance with the invention, the antenna 215 is operated at the resonant frequency with the user in close proximity to the antenna 215. For example, the oscillator 310 provides a signal to drive the antenna at the loaded resonant frequency, $f_{r\_loaded}$. In such an embodiment in accordance with the invention, the resonant circuit 355 is not at resonance when the user is not in close proximity to the antenna 215 and the voltage (V) is relatively low. The power management circuit 340 detects the relatively low voltage level and causes the electronic device 300 to be operated in a low power operational mode because the user is not in close proximity. When the user comes into close proximity to the antenna 215, the capacitive loading causes the resonant frequency of the resonant circuit 355 to change to the loaded resonant frequency, $f_{r\_loaded}$. The antenna 215 continues to be driven at the loaded resonant frequency, $f_{r\_loaded}$, when the user is in close proximity. Thus, the resonant circuit 355 is at a resonant condition when the user comes into close proximity. Therefore, there will be a voltage (V) increase at the antenna 215 when the user comes into close proximity. The power management circuit 340 detects the relatively high voltage level and causes the electronic device 300 to be operated in a high power operational mode because the user is in close proximity.

Still referring to FIG. 3, the power management circuit 340 includes a voltmeter 230 that is connected to the antenna 215 via a diode 345 and measures the voltage (V) at the antenna 215. The power management circuit 340 generates a signal that is provided on line 350 and that indicates whether the user is in close proximity to the antenna 215 or not. Line 350 transfers the signal to a power operational mode circuit 370, which provides various signals on lines 372–374 based on the power operational mode in which the device is operated. The power operational mode circuit 370 provides a gain signal on line 371 to the amplifier 320. Further, the power operational mode circuit 370 provides a signal on line 372 to control whether the LED 375 is powered on. Lines 373 and 374 transfer signals from the power operational mode circuit 370 to the photo-detector module 380 and the DSP 390 to control the power operational mode in which the photo-detector module 380 and the DSP 390 are operated.

The electronic device 300 of FIG. 3 also has an RF receiver 360 coupled to the antenna 215 via the inductive coupling mechanism 330. When the user is not in close proximity to the electronic device 300, the amplifier 320 is operated at a very low power level. Because the change in voltage (V) at the antenna 215 will be very large due to operating the antenna 215 at or near resonance, a user can be detected even though the power level is very low. When the electronic device 300 detects that a user is in close proximity to the antenna 215, the gain of the amplifier 320 is increased such that the antenna 215 is operated at a higher power level.

Figure 4:
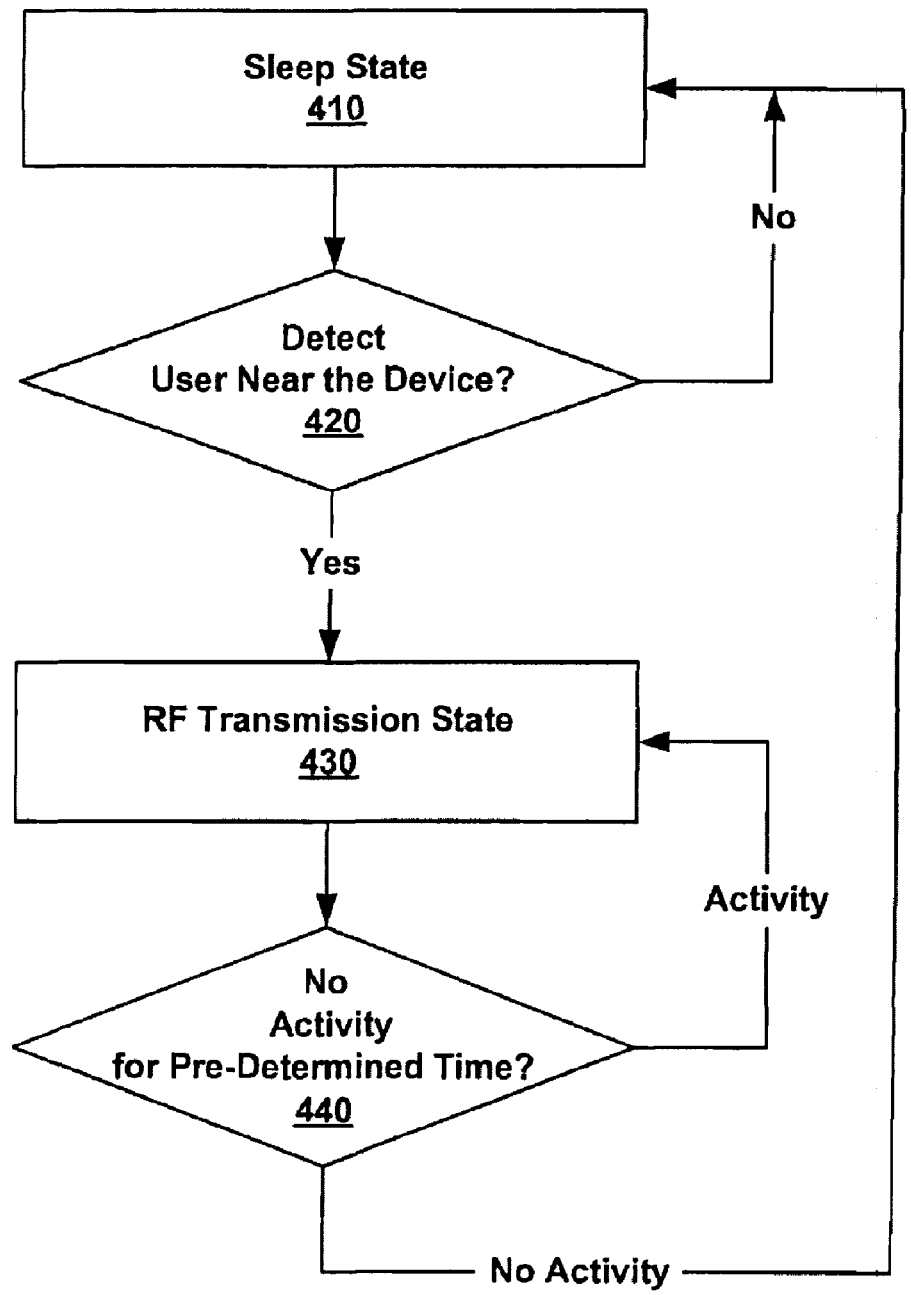
FIG. 4 is a flowchart illustrating operating an electronic device in multiple power states based on user proximity according to embodiments in accordance with the invention.

FIG. 4 is a flowchart 400 illustrating the selection of power states of an electronic device, such as an optical wireless mouse, based on user proximity detected in accordance with the invention. The sleep state at 410 occurs when the user has not had contact with the electronic device for a period of time. The sleep state consumes approximately 10 microwatts (μW) in one embodiment in accordance with the invention. During this state, the radio transceiver may by operated at a very low power. For embodiments in accordance with the invention in which the electronic device is an optical mouse, the duty cycle of the optical circuitry may be on the order of one cycle per second, such that one image is captured per second via the LED and associated circuitry. However, other duty cycles may be used. In one embodiment in accordance with the invention, the LED is shut down completely during a sleep state.

Still referring to FIG. 4, the electronic device detects the user in close proximity to the antenna, at 420. In one embodiment in accordance with the invention, the antenna is operated at an unloaded resonant frequency, $f_{r\_un-loaded}$, as discussed hereinabove. When the user comes into close proximity, the resonant frequency of the antenna circuit changes to the loaded resonant frequency, $f_{r\_loaded}$. The electronic device detects a drop in voltage at the antenna due to the antenna no longer operating at resonance. In another embodiment in accordance with the invention, the antenna is operated at a loaded resonant frequency, $f_{r\_loaded}$, as discussed hereinabove. When the user comes into close proximity, the resonant frequency of the antenna circuit changes to the loaded resonant frequency, $f_{r\_loaded}$. The electronic device detects a increase in voltage at the antenna due to the antenna now being at resonance.

The RF transmission state is entered at 430, in response to the detection of the user in close proximity at 420. In the RF transmission state, approximately 1 milliwatt (mW) of power may be consumed. In the RF transmission state, the radio transceiver is operated at a sufficient power level to allow radio frequency communication between the electronic device and remote wireless communication devices. For embodiments in accordance with the invention in which the electronic device is an optical mouse, in the RF transmission state, the duty cycle of the optical circuitry is increased to approximately a thousand or more cycles per second. Thus, the LED and associated circuitry capture and analyze a thousand or more images per second and able to determine the direction of motion of the device with great accuracy.

While in the RF transmission state, the process 400 monitors activity of the electronic device, as shown at 440. The electronic device is kept in the RF transmission state for a pre-determined period of time even if the user is no longer in close proximity to the electronic device. By monitoring activity of the electronic device, the RF transmission state can stay in effect even if the user takes his/her hand away from the electronic device. This allows the electronic device to have a very fast response time if the user is often placing his/her hand on the electronic device and then removing it. If there is no activity (and no user in close proximity) for a pre-determined period of time, the electronic device is put back into the sleep state by returning to 410. For embodiments in accordance with the invention in which the electronic device is an optical mouse, mouse activity is monitored. Thus, the mouse can remain in the RF transmission state for a pre-determined period of time if the user is not in close proximity and there is no mouse motion. If the user is not in close proximity and the mouse is not moved for the pre-determined period, for example, ten seconds, then the sleep state is re-entered by returning to 410.

While embodiments in accordance with the invention have been described in particular embodiments, it should be appreciated that the embodiments in accordance with the invention should not be construed as limited by such embodiments, but rather construed according to the below claims.

What is claimed is:

1. A device having user proximity detection comprising:
    a first circuit comprising an antenna wherein user proximity causes a change in resonant frequency of said first circuit, the resonant frequency chan in with reference to a frequency at which said antenna is operated; and
    a second circuit coupled to said antenna, said second circuit operable to detect a change in an operating characteristic of said antenna due to user proximity, wherein said change in said operating characteristic is detected based on a said change in resonant frequency of said first circuit during operation of said antenna.

2. The device of claim 1, wherein said second circuit is operable to detect a change in impedance of said antenna.

3. The device of claim 1, wherein said second circuit comprises a voltmeter.

4. The device of claim 1, further comprising a circuit operable to control state of said device, wherein said state is based on said operating characteristic of said antenna.

5. The device of claim 1, wherein said device is operated in a power saving mode when said operating characteristic indicates that a user is not proximate said antenna.

6. The device of claim 1, wherein said device is operated in a radio frequency transmission mode when said operating characteristic indicates that a user is proximate said antenna.

7. A device comprising:

a radio transceiver;

an antenna coupled to said radio transceiver wherein user proximity causes a change in resonant frequency of said antenna, the resonant frequency changing with reference to a frequency at which said antenna is operated; and a circuit coupled to said antenna, said circuit operable to detect capacitive loading of said antenna based on a said change in resonant frequency of a circuit comprising said antenna during operation of said antenna.

8. The device of claim 7, wherein said circuit comprises a voltmeter.

9. The device of claim 7, further comprising a circuit operable to control a power state of said device, wherein said state is based on said operating characteristic of said antenna.

10. A wireless data input device comprising:

a radio transceiver;

an antenna coupled to said radio transceiver wherein user proximity causes a change in resonant frequency of said antenna, the resonant frequency changing with reference to a frequency at which said antenna is tuned; and a first circuit coupled to said antenna, said first circuit operable to detect a said change in resonant frequency of a second circuit comprising said antenna during operation of said antenna, wherein said first circuit is further operable to cause said radio transceiver to be operated in a power operational mode based on said resonant frequency.

11. The device of claim 10, wherein said radio transceiver is operated in a low power operational mode when said operating characteristic indicates that a user is not proximate said radio transceiver, based on said resonant frequency.

12. The device of claim 10, wherein said radio transceiver is operated in a high power operational mode when said operating characteristic indicates that a user is proximate said radio transceiver, based on said resonant frequency.

13. The device of claim 10, wherein said antenna is tuned away from said resonant frequency of said second circuit with no user loading to said antenna and user proximity causes said resonant frequency of said second circuit to move closer to a frequency at which said antenna is tuned.

14. The device of claim 10, wherein said antenna is tuned near said resonant frequency of said second circuit with no user loading to said antenna and user proximity causes said resonant frequency to move farther from a frequency at which said antenna is tuned.

* * * * *

UNITED STATES PATENT AND TRADEMARK OFFICE
CERTIFICATE OF CORRECTION

| | | |
|---|---|---|
| PATENT NO. | : 7,228,102 B2 | Page 1 of 1 |
| APPLICATION NO. | : 10/635753 | |
| DATED | : June 5, 2007 | |
| INVENTOR(S) | : Gary Gordon | |

It is certified that error appears in the above-identified patent and that said Letters Patent is hereby corrected as shown below:

On Title Page, Col. 1, Line 1 - Delete "Technologie" and insert -- Technologies --.

Col. 8, line 46;
In Claim 1 (line 46), delte "chan in" and insert -- changing --.

Signed and Sealed this

Fifteenth Day of July, 2008

JON W. DUDAS
*Director of the United States Patent and Trademark Office*